US012302106B2

(12) United States Patent
Grayson et al.

(10) Patent No.: US 12,302,106 B2
(45) Date of Patent: May 13, 2025

(54) BI-DIRECTIONAL COMMUNICATION PROTOCOL FOR PRIVATE NETWORKS

(71) Applicant: Cisco Technology, Inc., San Jose, CA (US)

(72) Inventors: Mark Grayson, Berkshire (GB); Timothy P. Stammers, Raleigh, NC (US); Desmond Joseph O'Connor, London (GB)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 17/846,582

(22) Filed: Jun. 22, 2022

(65) Prior Publication Data

US 2023/0247429 A1  Aug. 3, 2023

Related U.S. Application Data

(60) Provisional application No. 63/305,502, filed on Feb. 1, 2022.

(51) Int. Cl.
*H04W 8/06* (2009.01)
*H04L 9/40* (2022.01)
(Continued)

(52) U.S. Cl.
CPC ....... *H04W 12/088* (2021.01); *H04L 63/0281* (2013.01); *H04W 8/06* (2013.01); *H04W 8/18* (2013.01); *H04W 80/00* (2013.01)

(58) Field of Classification Search
CPC ....... H04W 12/088; H04W 8/06; H04W 8/18; H04W 80/00
See application file for complete search history.

(56) References Cited

U.S. PATENT DOCUMENTS 11,076,281 B1   7/2021 Yau et al.
2019/0044932 A1*  2/2019 Kumar ............... H04W 12/12
(Continued)

FOREIGN PATENT DOCUMENTS

WO   2020094914 A1   5/2020
WO   2021063057      4/2021

OTHER PUBLICATIONS

International Search Report and Written Opinion for PCT application No. PCT/US2023/061557, issued on May 15, 2023, 14 pages.
(Continued)

*Primary Examiner* — Barry W Taylor
(74) *Attorney, Agent, or Firm* — Polsinelli P.C.

(57) ABSTRACT

Systems, methods, and computer-readable media are disclosed for facilitating bi-directional edge proxy-to-edge proxy communications across an enterprise firewall in 5G service-based architecture. In one aspect, a method includes receiving a subscription request from a user device to operate on a visited private network; determining that the user device is associated with a home network; and establishing a communication protocol between a security edge protection proxy of the visited private network and a security edge protection proxy of the home network, wherein the communication protocol enables bi-directional exchange of roaming signals between the visited private network and the home network while user device is operating on the visited private network.

19 Claims, 13 Drawing Sheets

(51) Int. Cl.
*H04W 8/18* (2009.01)
*H04W 12/088* (2021.01)
*H04W 80/00* (2009.01)

(56) References Cited

U.S. PATENT DOCUMENTS

| | | |
|---|---|---|
| 2020/0036754 A1 | 1/2020 | Livanos |
| 2021/0044569 A1* | 2/2021 | Xu ........................ H04L 67/564 |
| 2021/0120416 A1* | 4/2021 | S Bykampadi ..... H04L 65/1069 |
| 2021/0360393 A1 | 11/2021 | Nair et al. |
| 2022/0200966 A1* | 6/2022 | de-Gregorio-Rodriguez .............. H04L 61/4511 |
| 2022/0240172 A1* | 7/2022 | Hallenstal ............. H04W 88/18 |

OTHER PUBLICATIONS

"3rd Generation Partnership Project; Technical Specification Group Services and System Aspects; Procedures for the 6G System (5GS); Stage 2 (Release 17)", 3GPP TS 23.502, V17.3.0, Dec. 23, 2021, 727 pages.

"3rd Generation Partnership Project; Technical Specification Group Services and System Aspects; Security architecture and procedures for 5G System (Release 15)", 3GPP TS 33.501, V15.0.0, May 4, 2018, 131 pages.

* cited by examiner

BI-DIRECTIONAL COMMUNICATION PROTOCOL FOR PRIVATE NETWORKS

CROSS-REFERENCE TO RELATED APPLICATIONS

This application claims the benefit of priority to U.S. Provisional Patent Application No. 63/305,502 filed on Feb. 1, 2022 and titled "EDGE PROXY TO EDGE PROXY COMMUNICATIONS ACROSS ENTERPRISE FIREWALLS," the disclosure of which is herein incorporated by reference in its entirety.

TECHNICAL FIELD

The subject matter of this disclosure relates in general to the field of computer networking, and more specifically, to facilitating bi-directional communications between private networks across an enterprise firewall.

BACKGROUND

Current mobile and wireless communication systems have widely adopted a next-generation wireless communication system, 5G, which provides much higher data rates and lower latency. Many communication service providers (e.g., mobile network operators) that deploy the 5G system have developed roaming services that extend the coverage of a home operator's services, allowing its mobile users to use those services within another operator's network. In the 5G system, for the roaming services, Service-Based Architecture (SBA) and security functionality to protect the network edge are newly supported by a new network function (NF) called the Security Edge Protection Proxy (SEPP).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
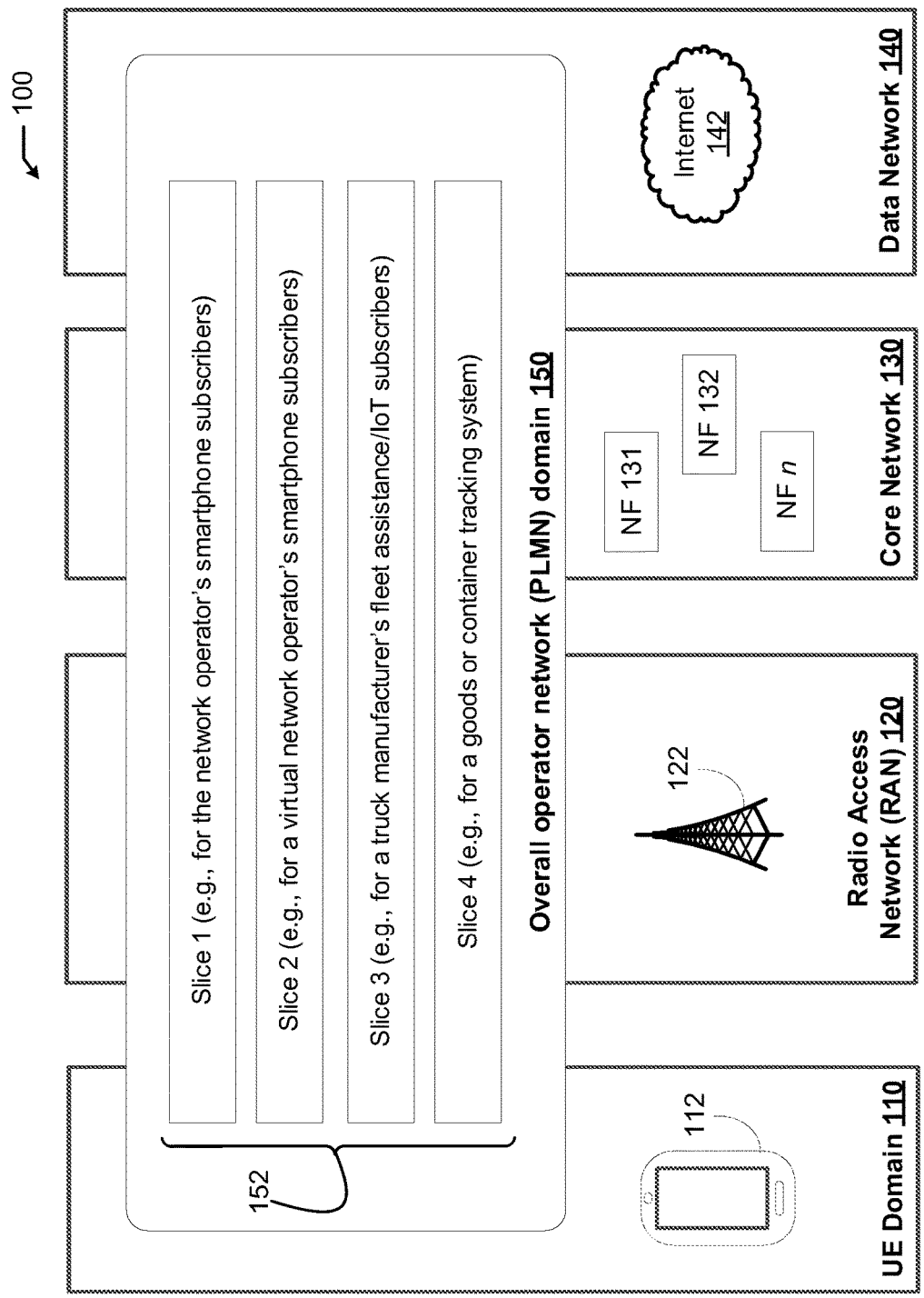
FIG. 1 illustrates an exemplary schematic representation of a 5G network environment in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for supporting bi-directional communications between private networks across enterprise firewalls of the private networks.

In one aspect, a method includes receiving a subscription request from a user device to operate on a visited private network; determining that the user device is associated with a home network; and establishing a communication protocol between a security edge protection proxy of the visited private network and a security edge protection proxy of the home network, wherein the communication protocol enables bi-directional exchange of roaming signals between the visited private network and the home network while user device is operating on the visited private network.

In another aspect, the method further includes re-writing a callback Uniform Resource Identifier (URI) signaled by a network function in the visited private network and received by the security edge protection proxy of the home network to a URI that will resolve to the security edge protection proxy of the home network.

In another aspect, the method further includes recovering Diameter origin host and origin information from the subscription request and updating routing information in the home network to enable routing of server-initiated messages originated in the home network towards the visited private network.

In another aspect, the method further includes determining that subscription of the user device to the visited private network has ended; and terminating the communication protocol between the security edge protection proxy of the home network and the security edge protection proxy of the visited private network.

In another aspect, the method further includes determining that a timer has been expired, the timer defining a time period for the communication protocol; and terminating the communication protocol between the home network and the visited private network upon determining that the timer has expired.

In another aspect, when the visited private network is a private 5G network, a bi-directional N32 interface is used to forward signals between the visited private network and the home network via the communication protocol.

In another aspect, when the visited private network is a private LTE network, a S6a interface is used to forward signals between the visited private network and the home network via the communication protocol.

In another aspect, the method further includes determining that at least one outstanding subscription to the visited private network exists, the outstanding subscription being for a second user device associated with the home network; and maintaining the communication protocol between the security edge protection proxy of the home network and the security edge protection proxy of the visited private network while the at least one outstanding subscription is valid.

In one aspect, a network component includes one or more memories having computer-readable instructions stored therein and one or more processors. The one or more processors are configured to execute the computer-readable instructions to receive a subscription request from a user device to operate on a visited private network; determine that the user device is associated with a home network; and establish a communication protocol between a security edge protection proxy of the visited private network and a security edge protection proxy of the home network, wherein the communication protocol enables bi-directional exchange of roaming signals between the visited private network and the home network while user device is operating on the visited private network.

In one aspect, one or more non-transitory computer-readable media includes computer-readable instructions, which when executed by one or more processors of a network component, cause the network component to receive a subscription request from a user device to operate on a visited private network; determine that the user device is associated with a home network; and establish a communication protocol between a security edge protection proxy of the visited private network and a security edge protection proxy of the home network, wherein the communication protocol enables bi-directional exchange of roaming signals between the visited private network and the home network while user device is operating on the visited private network.

DESCRIPTION OF EXAMPLE EMBODIMENTS

The following acronyms are used throughout the present disclosure, provided below for convenience.
5GNF: 5G Network Function
AAA: Authentication, Authorization, and Accounting
ANP or AP: Access Network Provider or Access Provider
DEA: Diameter Edge Agent
DNS: Domain Name System
DRA: Diameter Routing Agent
HPLMN: Home Public Land Mobile Network
IDP: Identity Provider
NAS: Non-Access Stratum
PLMN: Public Land Mobile Network
SBA: Service-Based Architecture
SCP: Service Communication Proxy
SEPP: Security Edgy Protection Proxy
TCP: Transmission Control Protocol
TLS: Transport Layer Security
UE: User Equipment
VPLMN: Visited Public Land Mobile Network As previously noted, a SEPP is a new network function in the 5G system, which supports 5G service-based architecture and security functionality (i.e., protects the network edge). The 5G service-based architecture allows any third-party application to interact with 5G NFs in a secured manner. As follows, the 5G service-based architecture requires the ability to support arbitrary inbound connections from an initiating SEPP to a responding SEPP. For example, GSM Association (GSMA) requires IP addresses of initiating SEPPs to be registered and shared between operators so that the risk of accepting inbound connections from third-party networks can be reduced.

However, the currently existing approach for roaming between private networks can be problematic since the registration of border nodes can become burdensome if the number of networks is high. Further, as the diversity of networks is increasing, conventional firewall traversal for SEPP-to-SEPP communications needs to be enabled. However, conventional firewalls favor policy control of outbound connections and do not permit inbound connections. Also, the 5G network architecture requires timely delivery of messages from an HPLMN to a VPLMN. For example, a delay in the delivery of information (e.g., Nudm_UECM_DeregistrationNotify) after a UE has registered with a neighboring PLMN can generate issues if the UE subsequently returns to the original PLMN.

Therefore, there exists a need for a communication protocol that can support bi-directional communications between networks across an enterprise firewall in a 5G service-based architecture. The present technology includes systems, methods, and computer-readable media for solving the foregoing problems and discrepancies, among others. In some examples, systems, methods, and computer-readable media are provided for enabling bi-directional communications between a home network provider and a visited network provider (e.g., SEPP-to-SEPP communications in 5G service-based architecture). In particular, the proposed solution relates to establishing a communication protocol for bi-directional communications between a home network provider and a visited network provider when a user device from a home network enters the visited private network. Further, the proposed solution pertains to automatically terminating the communication protocol when the user device leaves the visited network. It is understood that the term "WebSocket" is used to describe the communication protocol of the present disclosure that supports bi-directional communications between private networks, more specifically, SEPP-to-SEPP communications across enterprise firewalls.

FIG. 1 depicts an exemplary schematic representation of a 5G network environment 100 in which one or more aspects of the present disclosure may operate. As illustrated, network environment 100 is divided into four domains, each of which will be explained in greater depth below; User Equipment (UE) domain 110, e.g., of one or more enterprise, in which a plurality of user cellphones or other connected devices 112 reside; Radio Access Network (RAN) domain 120, in which a plurality of radio cells, base stations, towers, or other radio infrastructure 122 resides; Core Network 130, in which a plurality of Network Functions (NFs) 131, 132, . . . , n reside; and Data Network 140, in which one or more data communication networks such as the Internet 142 reside. Additionally, Data Network 140 can support SaaS providers configured to provide SaaSs to enterprises, e.g. to users in UE domain 110.

Core Network 130 contains a plurality of Network Functions (NFs), shown here as NF 131, NF 132 . . . NF n. In some examples, core network 130 is a 5G core network (5GC) in accordance with one or more accepted 5GC architectures or designs. In some instances, core network 130 is an Evolved Packet Core (EPC) network, which combines aspects of the 5GC with existing 4G networks. Regardless of the particular design of core network 130, the plurality of NFs typically executes in a control plane of core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some examples, the plurality of NFs of core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some instances, an AMF/MME can be common to or otherwise shared by multiple slices of the plurality of network slices 152, and in some examples an AMF/MME can be unique to a single one of the plurality of network slices 152.

The same is true of the remaining NFs of core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is in some examples a Public Land Mobile Network (PLMN) and can be thought of as the carrier or business entity that provides cellular service to the end-users in UE domain 110. Within the operator network domain 150, a plurality of network slices 152 are created, defined, or otherwise provisioned in order to deliver a desired set of defined features and functionalities, e.g. SaaSs, for a certain use case or corresponding to other requirements or specifications. Note that network slicing for the plurality of network slices 152 is implemented in end-to-end fashion, spanning multiple disparate technical and administrative domains, including management and orchestration planes (not shown). In other words, network slicing is performed from at least the enterprise or subscriber edge at UE domain 110, through the RAN 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

Figure 2:
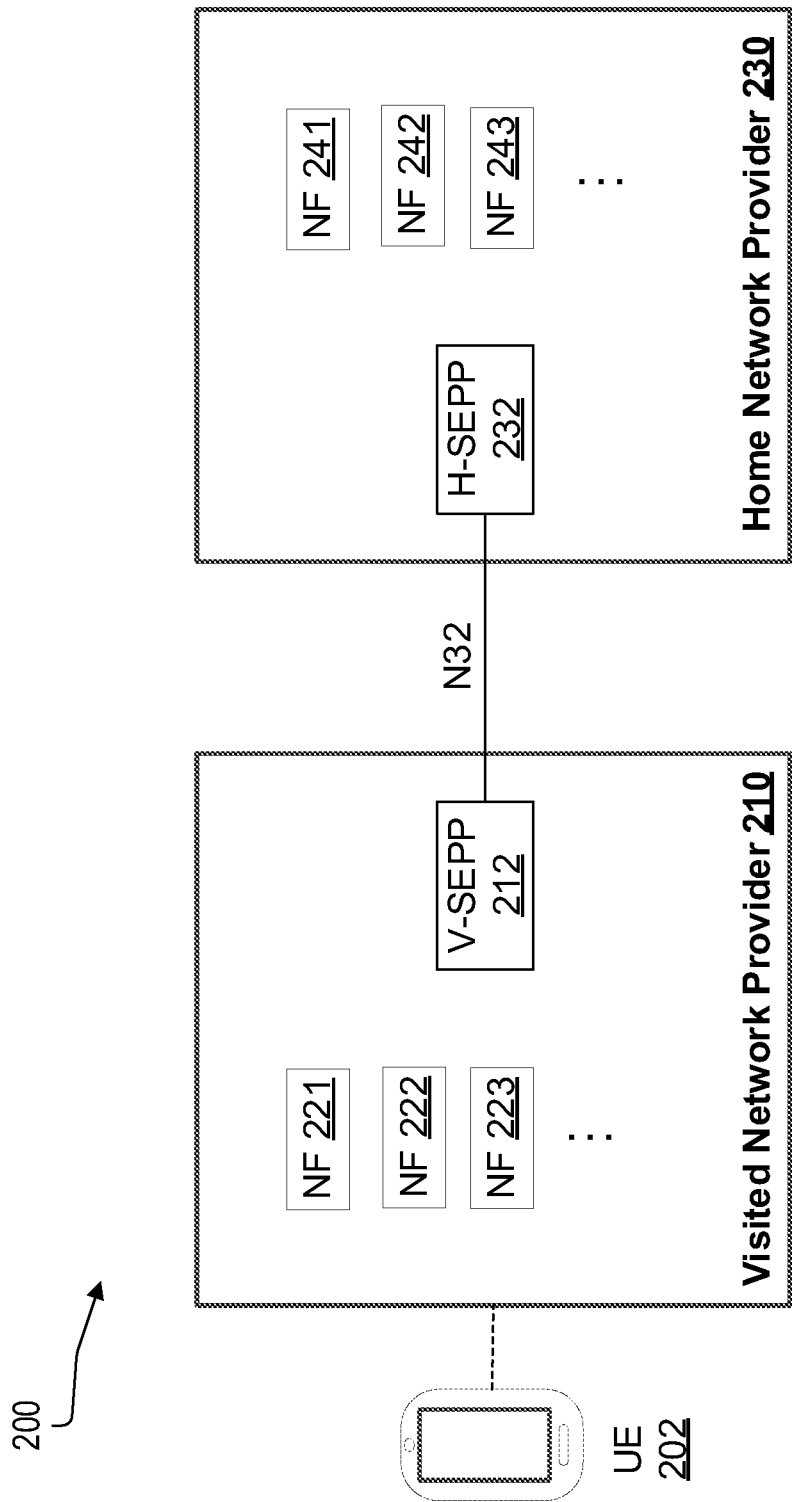
FIG. 2 illustrates an example network environment for establishing a bi-directional communication protocol in 5G service-based architecture according to some examples of the present disclosure.

FIG. 2 illustrates an example network environment 200 for establishing a bi-directional communication protocol according to some examples of the present disclosure. In some examples, network environment 200 comprises UE 202, visited network provider 210, and home network provider 230. UE 202, which was initially connected with home network provider 230, roams into an area whose connection is covered by visited network provider 210.

According to some implementations, visited network provider 210 comprises V-SEPP 212 and a plurality of network functions 221, 222, 223, etc. (e.g., similar to network functions 131, 132, . . . n of core network 130 as illustrated in FIG. 1). Also, home network provider 230 comprises H-SEPP 232 and a plurality of network functions 241, 242, 243, etc. (e.g., similar to network functions 131, 132, . . . n of core network 130 as illustrated in FIG. 1). In some instances, an N32 interface is used as an interface between V-SEPP 212 of visited network provider 210 and H-SEPP 232 of home network provider 230 to enable bi-directional communication between V-SEPP 212 and H-SEPP 232.

In some examples, UE 202 appears in an area covered by visited network provider 210. As follows, visited network provider 210 needs to authenticate UE 202 (e.g., via HTTP/2 request). An inbound user device on the network (e.g., UE 202 on visited network provider 210) can trigger the establishment of a WebSocket with a network that holds the credentials necessary to authenticate the particular user device. In some instances, while UE 202 is being served by the network, the WebSocket can exist to allow the bi-directional flow of information (i.e., exchange of roaming signals) between visited network provider 210 and home network provider 230. When UE 202 leaves the area covered by visited network provider 210, the WebSocket can be terminated as roaming is no longer required.

In some instances, if a second UE from the same home network comes into the same visited network, the second UE can use the same WebSocket. As long as at least one UE stays in the visited network, the WebSocket is maintained. In other words, only when the last UE of the home provider 230 leaves the network of visited network provider 210, the WebSocket can be terminated. In some examples, the home network of UE can be identified based on a network code of UE.

FIGS. 3A-3D illustrate an example enhanced roaming system 300 with data flow for supporting bi-directional communication between 5G networks according to some examples of the present disclosure. An example network environment in FIGS. 3A-3D comprises 5G Access Network Provider (ANP) 302 (i.e., visited network provider), 5G Identity Provider (IDP) 304 (i.e., home network provider), and Domain Name System (DNS) 306 between 5G ANP 302 and 5G IDP 304. In some examples, 5G ANP 302 comprises 5GNF 308, SCP 310, V-SEPP 312, and firewall 314. Also, 5G IDP 304 comprises 5GNFs 316 and 318, SCP 320, and H-SEPP 322.

In some examples, 5G ANP 302 and 5G IDP 304 can be an HPLMN and a VPLMN (or vice versa). A VPLMN is a PLMN upon which a mobile subscriber has roamed when leaving its HPLMN.

According to some examples, V-SEPP 312 and H-SEPP 322 can be positioned on the edge of each network (e.g., 5G ANP 302 and 5G IDP 304, respectively) to provide border protection in a mobile core infrastructure network. Also, V-SEPP 312 and H-SEPP 322 can be configured to proxy a message from a network function in 5G ANP 302 (e.g., 5GNF 308) to a network function in 5G IDP 304 (e.g., 5GNFs 316 and 318), or vice versa. As follows, information can be exchanged between NFs in both 5G ANP 302 and 5G IDP 304.

Figure 3A:
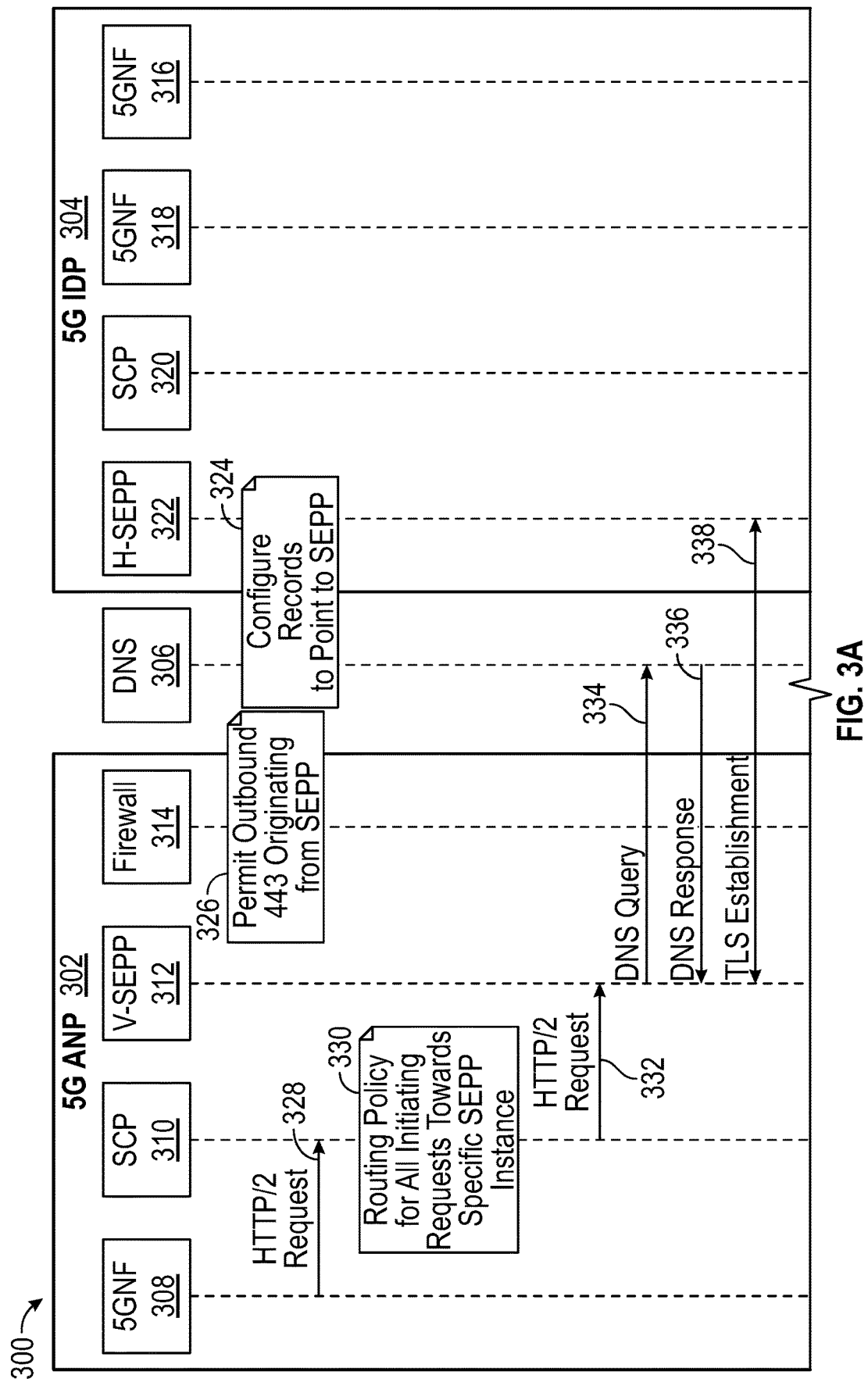
FIGS. 3A-3D illustrate an example diagram of an enhanced roaming system that supports bi-directional communication between 5G networks according to some examples of the present disclosure.

As illustrated in FIG. 3A, 5G IDP 304 can configure records to point to SEPP at step 324. Also, 5G ANP 302 permits outbound port originating from SEPP at step 326. In some examples, 5GNP 308 sends a http/2 request to SCP 310 at step 328, which then forwards it to V-SEPP 312 at step 332. Also, SCP 310 establishes a routing policy for all initiating requests towards a specific SEPP instance at step 330. At step 334, V-SEPP 312 sends a DNS query to DNS 306, which then sends back a DNS response at step 336. As follows, at step 338, TLS is established between V-SEPP 312 and H-SEPP 322, for example, by using Wireless Broadband Alliance (WBA) Public Key Infrastructure (PKI).

Figure 3B:
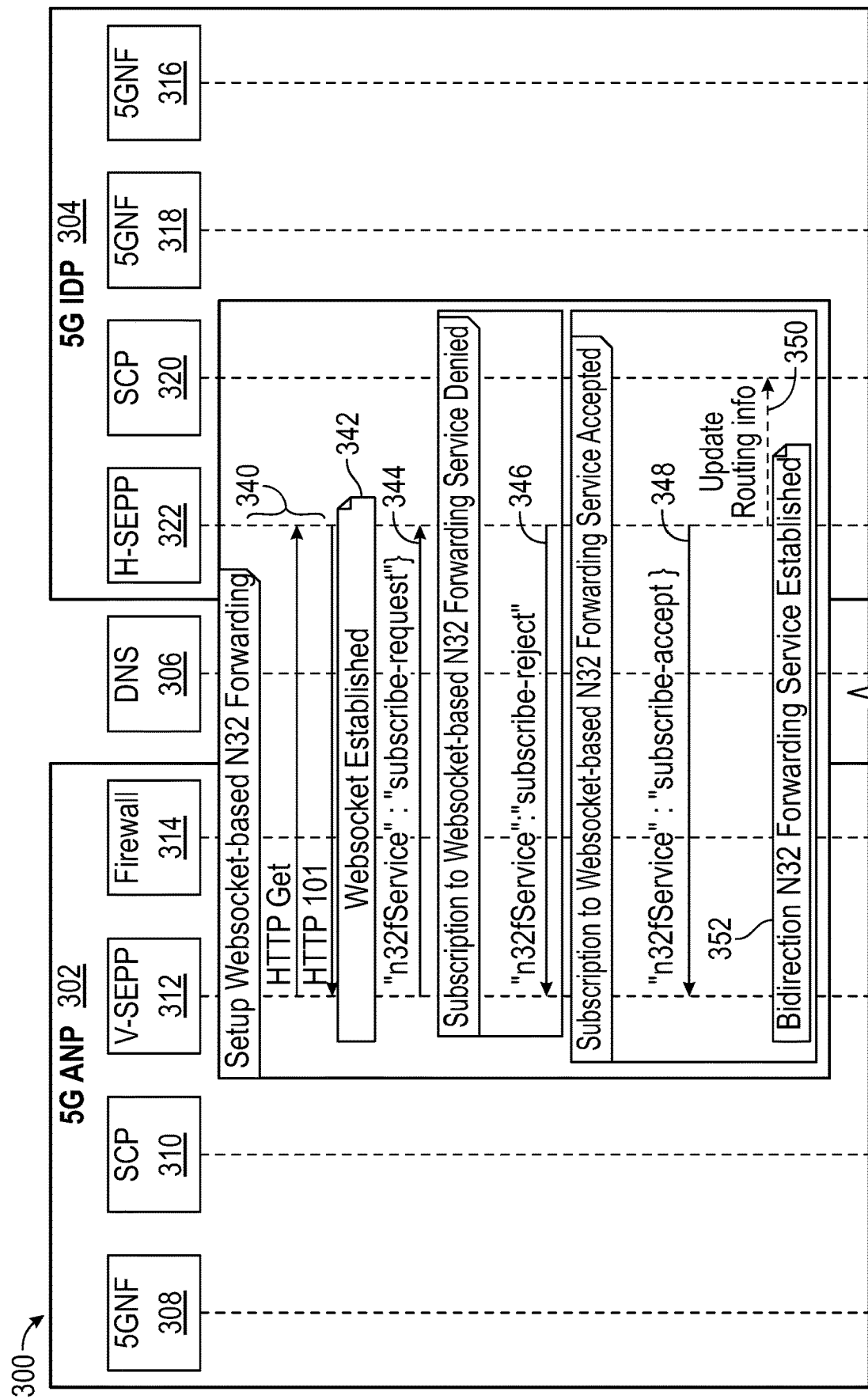

FIG. 3B is a continuous diagram of FIG. 3A. More specifically, FIG. 3B illustrates the setup process of WebSocket-based N32-f. N32-f is the forwarding interface between the SEPPs, for example, which can be used for forwarding the communication between the network function of an access provider (e.g., 5GNF 308 of 5G ANP 302) and the network function of an identity provider (e.g., 5GNFs 316 and 318 of 5G IDP 304). In some examples, a WebSocket of the present disclosure is a communications protocol that can provide communication channels over a single TCP connection and therefore enable two-way interactive communication (i.e., bi-directional communication) between 5GNFs 221, 222 and 223 of visited network provider 210 and 5GNFs 241, 242 and 243 of the home network provider 230 via the two SEPPs (e.g., V-SEPP 312 and H-SEPP 322).

At step 340, V-SEPP 312 sends an HTTP get request to H-SEPP 322, which then sends back an HTTP 101 response. As follows, WebSocket is established between V-SEPP 312 and H-SEPP 322 at step 342. At step 344, V-SEPP 312 can send a subscription request, via N32-f service, to H-SEPP 322. If the subscription request is denied, at step 346, H-SEPP 322 sends a subscription rejection message, via N32-f service, to V-SEPP 312. In some instances, the subscription rejection message can include problem details. If the subscription request is accepted, at step 348, H-SEPP 322 sends a subscription acceptance message, via N-32-f service, to V-SEPP 312 and updates routing information for 5G ANP 302 with SCP 320 at step 350. As follows, bidirectional N-32-f service can be established between V-SEPP 312 and H-SEPP 322 at step 352.

Figure 3C:
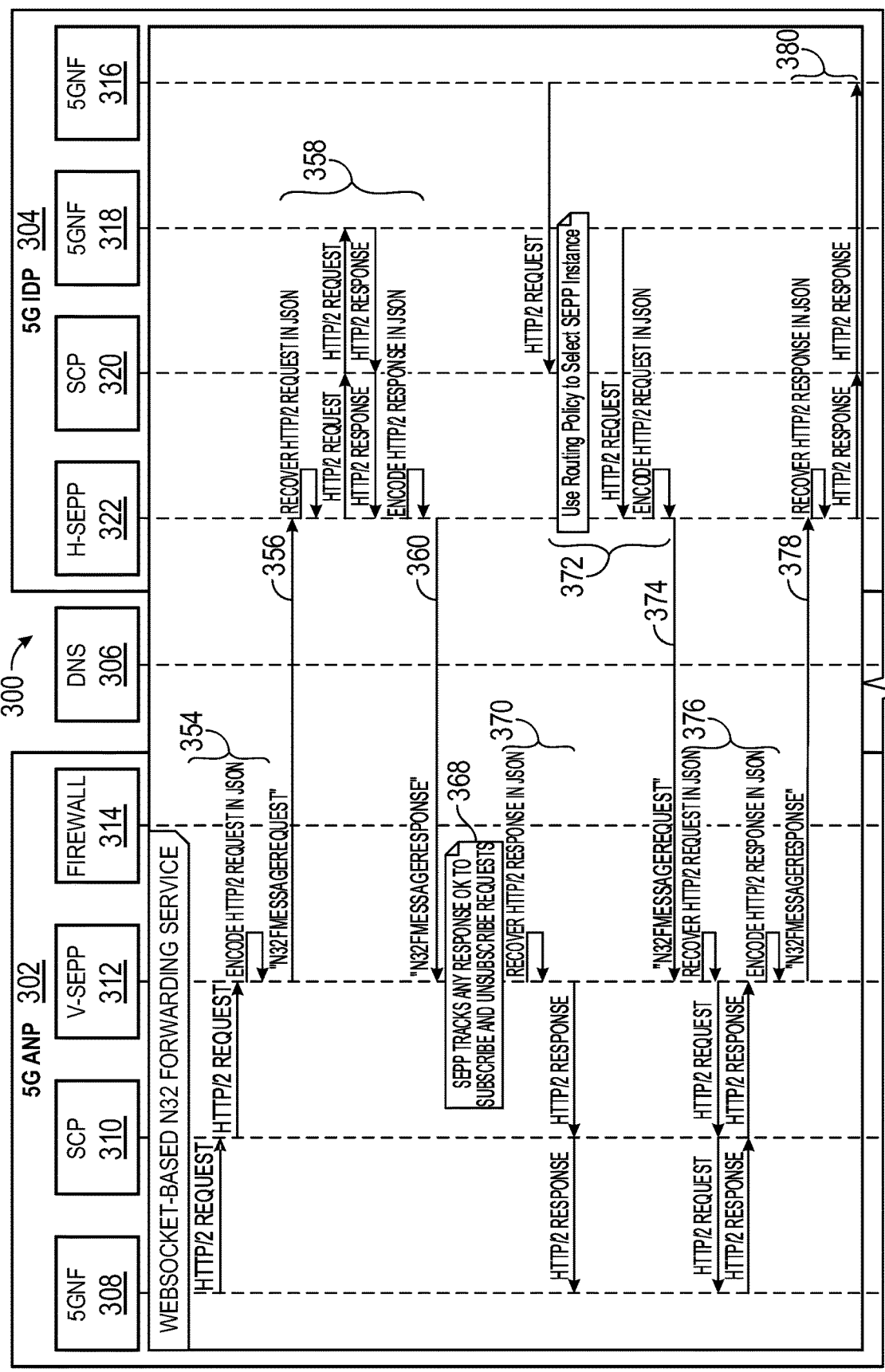

FIG. 3C is a continuous diagram of FIG. 3B. More specifically, FIG. 3C illustrates the process of WebSocket-based N32-f service. At step 354, 5GNF 308 of 5G ANP 302 sends a http/2 request to SCP 310, which then forwards the same to V-SEPP 312. Upon receipt of the http/2 request, V-SEPP can encode the http/2 request in JavaScript Object Notation (JSON) at step 354. As follows, V-SEPP 312 sends an N32-f message request to H-SEPP 322 at step 356. Upon receipt of the request, H-SEPP 322 can recover the http/2 request in JSON and send the http/2 request to SCP 320, which then forwards the same to 5GNF 318 at step 358. Then, 5GNF 318 sends a http/2 response to SCP 320, which forwards the same to H-SEPP 322. H-SEPP 322 encodes the http/2 response in JSON and sends an N32-f message response to V-SEPP 312 at step 360. At step 368, V-SEPP 312 tracks any response from other networks. At step 370, V-SEPP 312 recovers the http/2 response in JSON and forwards the response to SCP 310, which then forwards the same to 5GNF 308.

Similar to steps 354-370, 5G IDP 304 can utilize the same WebSocket-based N32-f as it supports bi-directional communications between SEPPs. 5GNF 316 of 5G IDP 304 can send a http/2 request to SCP 320. 5G IDP 304 can use routing policy to select SEPP instance at step 372 and forwards the http/2 request to H-SEPP 322, which then encodes the http/2 request in JSON. At step 374, H-SEPP 322 can send an N32-f message request to V-SEPP 312, which then recovers the http/2 request in JSON at step 376. V-SEPP 312 can forward the recovered http/2 request to SCP 310, which then forwards the same to 5GNF 308. Upon receipt of the request, 5GNF 308 can send a http/2 response to SCP 310, which then forwards the same to V-SEPP 312. V-SEPP 312 can encode the http/2 response in JSON. At step 378, V-SEPP 312 sends an N32-f message response to H-SEPP 322. At step 380, H-SEPP 322 recovers the http/2 response in JSON and forwards the http/2 response to SCP 320, which then forwards the same to 5GNF 316, which initially requested the http/2 request.

Figure 3D:
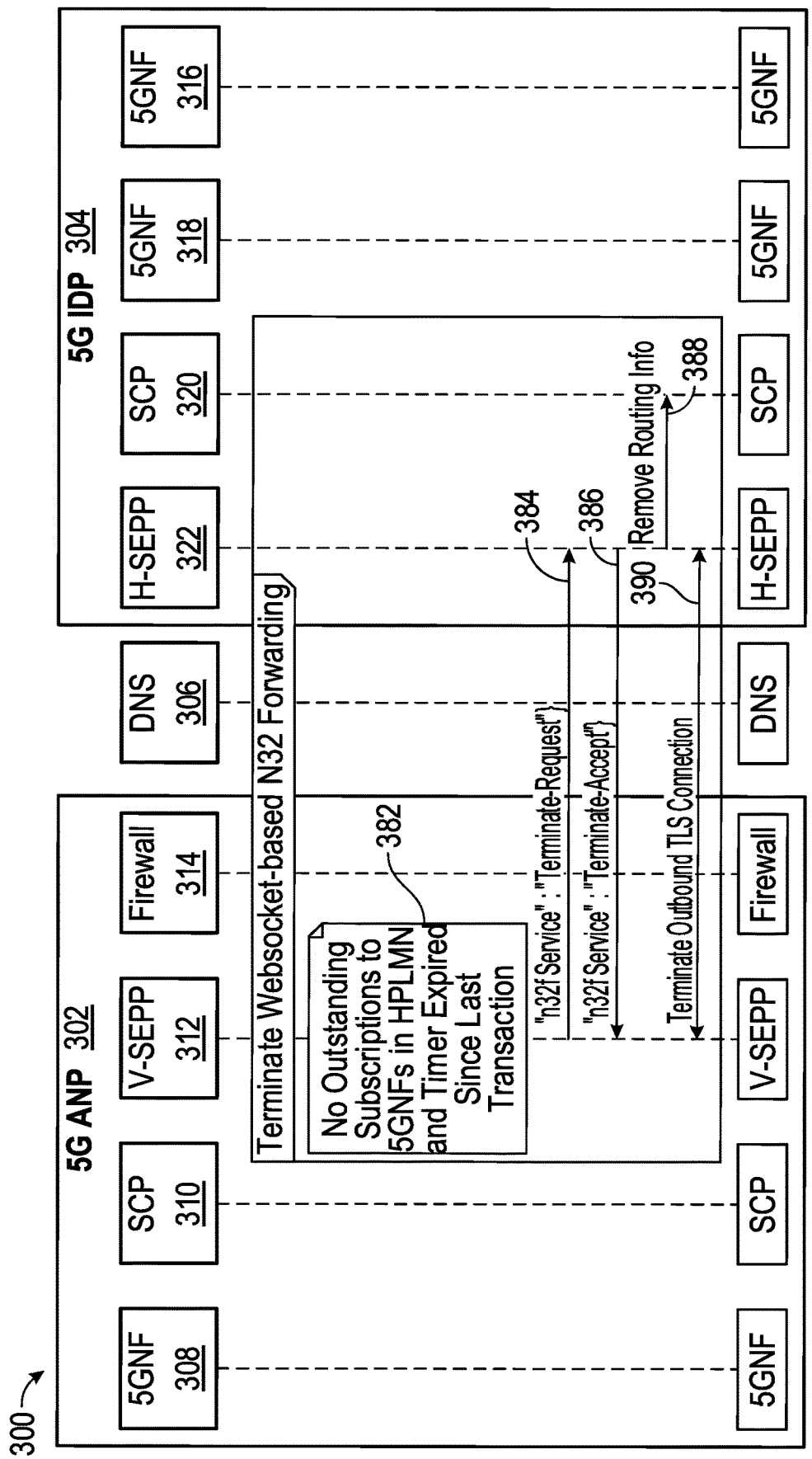

FIG. 3D is a continuous diagram of FIG. 3C. More specifically, FIG. 3D illustrates the process of terminating WebSocket-based N32-f. At step 382, V-SEPP 312 can check two conditions to determine if the WebSocket-based N32-f can be terminated. First, V-SEPP 312 determines that there is no outstanding subscription to 5GNFs of 5G ANP 302. Also, V-SEPP 312 determines that a timer has expired since the last transaction. If both conditions are met, V-SEPP 312 can, at step 384, send a termination request to H-SEPP 322. Upon receipt of the termination request, H-SEPP 322 can send a termination acceptance message to V-SEPP 312 at step 386. Also, H-SEPP 322 requests SCP 320 to remove routing information for 5G ANP 302 at step 388. As follows, the outbound TLS connection between V-SEPP 312 and H-SEPP 322 can be terminated at step 390.

FIGS. 4A-4D illustrate an example enhanced roaming system 400 with data flow for supporting bi-directional communication between a 4G network and a 5G network according to some examples of the present disclosure. An example network environment in FIGS. 4A-4D comprises a 4G ANP 402 (i.e., visited network provider), 5G IDP 404 (i.e., home network provider), and DNS 406 between 4G ANP 402 and 5G IDP 404. In some examples, 4G ANP comprises NAS 408, DRA 410, V-DEA 412, and firewall 414. Also, 5G IDP 404 comprises H-DEA 416, DRA 418, and AAA Server 420. Compared to example flow of FIGS. 3A-D, example flow of an enhanced roaming system 400 illustrated in FIGS. 4A-4D utilizes the use of an S6a service. In some examples, S6a is a diameter-based authentication application used by the Mobility Management Entity (MME) nodes to retrieve authentication information from Home Subscriber Server (HSS).

In some instances, 4G ANP 402 and 5G IDP 404 can be an HPLMN and a VPLMN (or vice versa). A VPLMN is a PLMN upon which a mobile subscriber has roamed when leaving its HPLMN.

Figure 4A:
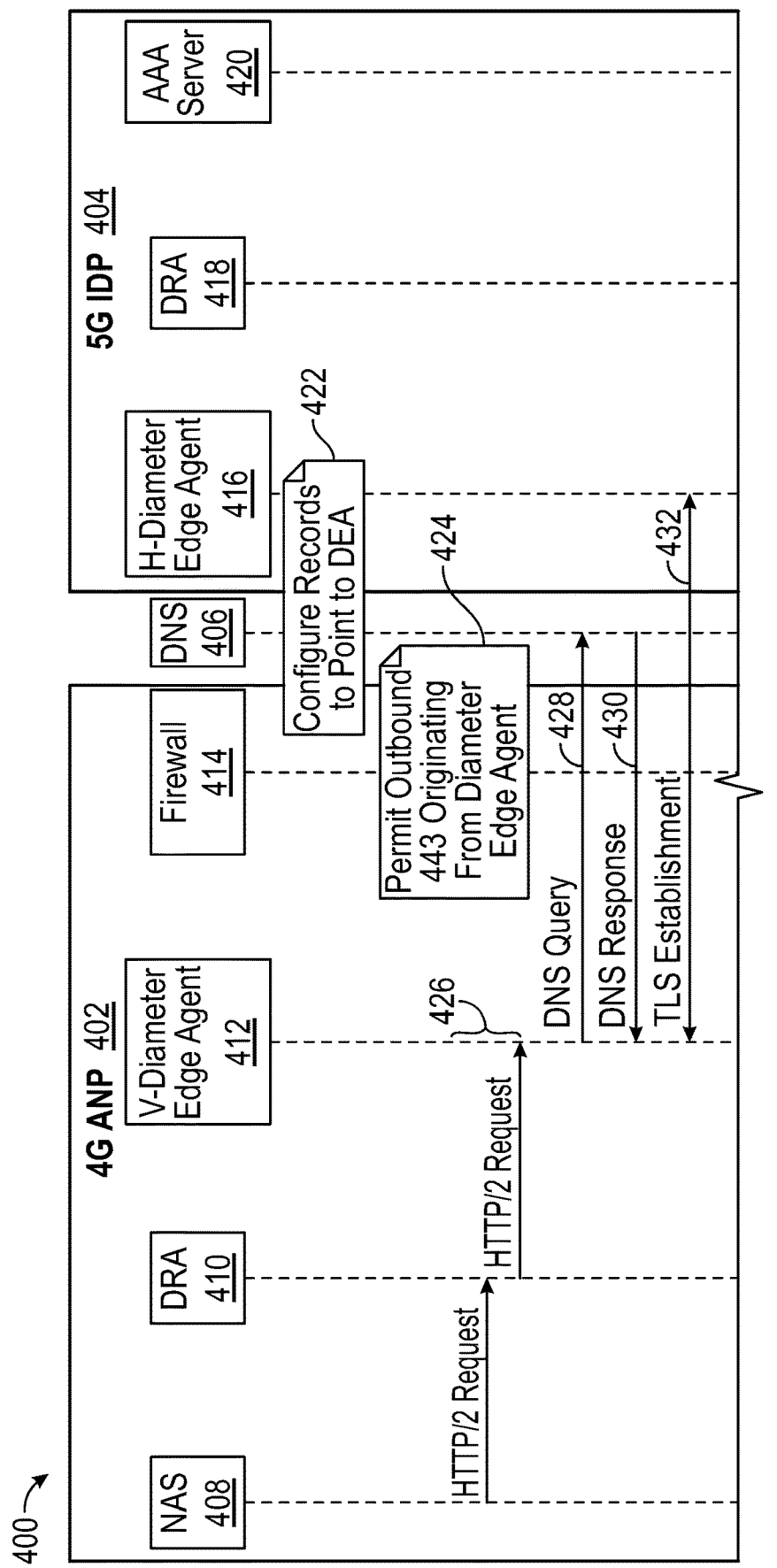
FIGS. 4A-4D illustrate an example diagram of an enhanced roaming system that supports bi-directional communication between a 4G network and a 5G network according to some examples of the present disclosure.

As illustrated in FIG. 4A, 5G IDP 404 can configure records to point to DEA at step 422. Also, 4G ANP 402 permits outbound port originating from DEA at step 424. At step 426, NAS 408 sends a Diameter request to DRA 410, which then forwards the same to V-DEA 412. At step 428, V-DEA 412 sends a DNS query to DNS 406. Then, DNS 406 sends a DNS response to V-DEA 412 at step 430. As follows, at step 432, TLS is established between V-DEA 412 and H-DEA 416, for example, by using WBA PKI.

Figure 4B:
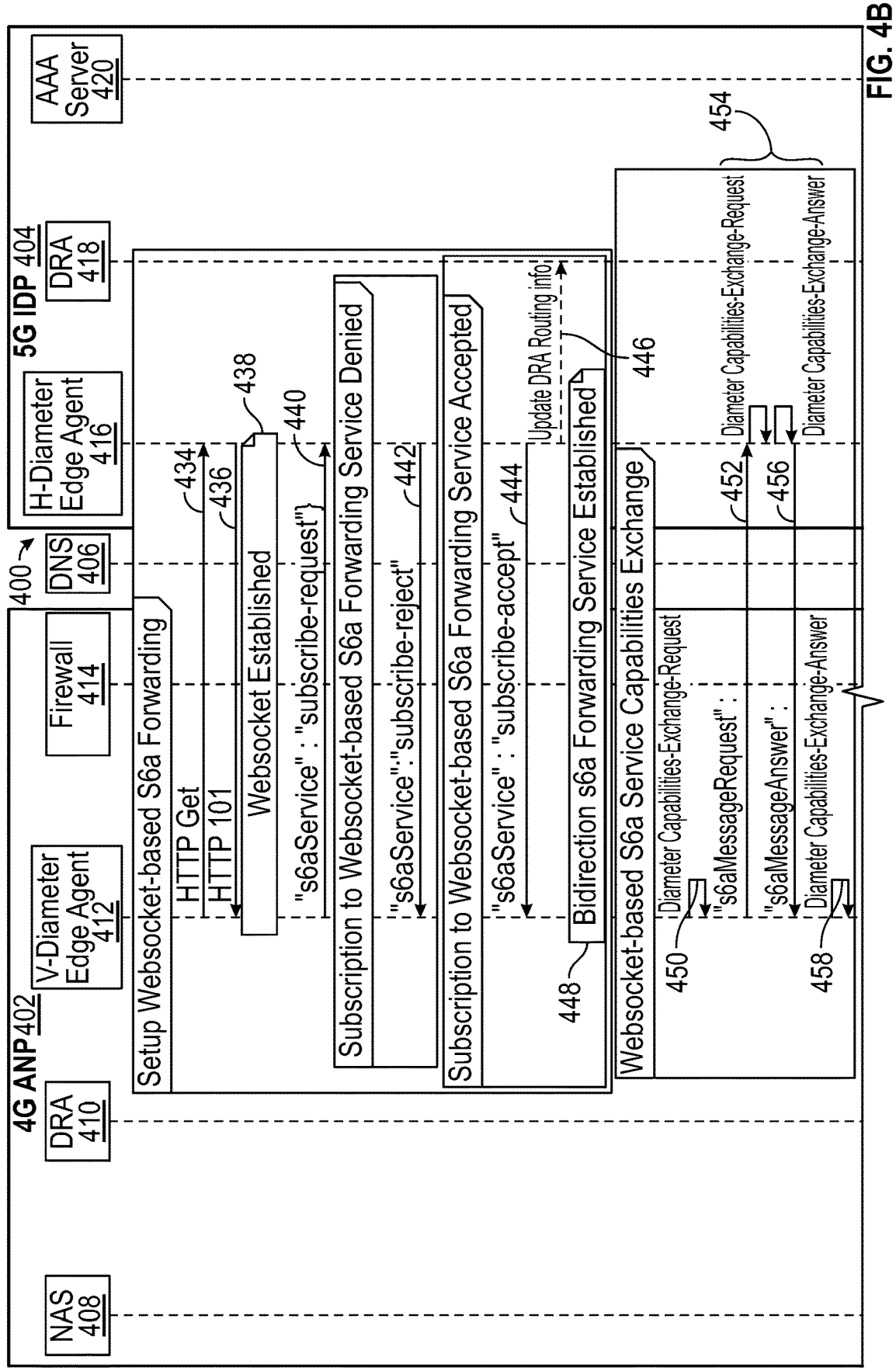

FIG. 4B is a continuous diagram of FIG. 4A. More specifically, FIG. 4B illustrates the setup process of WebSocket-based S6a-f. More specifically, procedure 400 includes WebSocket establishment between 4G ANP and 5G IDP. S6a-f is an interface that supports end to end diameter-based signaling between network functions (e.g., NAS 408 of 4G ANP 402 and AAA server 420 of 5G IDP 404). As previously described, a WebSocket is a computer communications protocol that provides communication channels over a single TCP connection and therefore enables two-way interactive communication (i.e., bi-directional communication) between two DEAs (e.g., V-DEA 412 and H-DEA 416).

At step 434, V-DEA 412 sends an HTTP get request to H-DEA 416, which then sends back an HTTP 101 response at step 436. As follows, WebSocket is established between V-DEA 412 and H-DEA 416 at step 438.

At step 440, V-DEA 412 can send a subscription request, via S6a service, to H-DEA 416. The subscription request includes Diameter origin host and realm identifiers for the NAS 408 of 4G ANP 402. If the subscription request is denied, at step 442, H-DEA 416 sends a subscription rejection message, via S6a service, to V-DEA 412. In some instances, the subscription rejection message can include problem details. If the subscription request is accepted, at step 444, H-DEA 416 sends a subscription acceptance message, via S6a service, to V-DEA 412. Also, H-DEA 416 updates routing information for the Diameter origin host and realm identifiers for the NAS 408 of 4G ANP 402 with DRA 418 at step 446. As follows, bidirectional S6a-f service is established between V-DEA 412 and H-DEA 416 at step 448.

FIG. 4B further illustrates the process of WebSocket-based S6a service capabilities exchange. At step 450, V-DEA can generate a diameter capabilities exchange request. At step 452, V-DEA 412 can send an S6a message request to H-DEA 416, which then decodes the diameter capabilities exchange request and generates an answer at step 454. H-DEA 416 sends the diameter capabilities exchange answer to V-DEA 412 at step 456. At step 458, V-DEA decodes the diameter capabilities exchange answer.

Figure 4C:
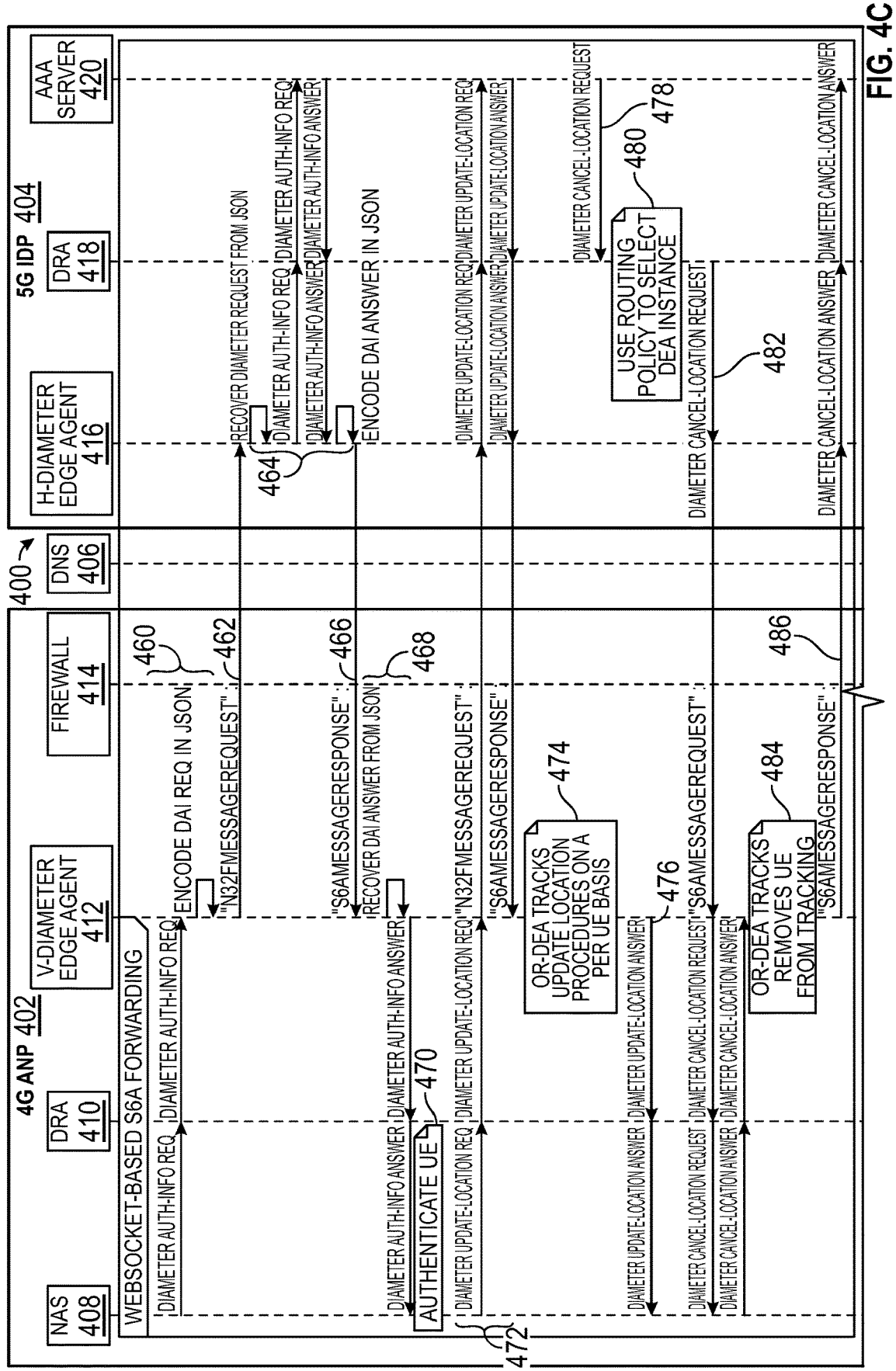

FIG. 4C is a continuous diagram of FIG. 4B. In particular, FIG. 4C illustrates the process of the WebSocket-based S6a forwarding service. At step 460, NAS 408 sends a diameter authentication information request to DRA 410, which then forwards the same to V-DEA 412. V-DEA 412 encodes the diameter authentication information request in JSON. At step 462, V-DEA 412 sends an N32f message request to H-DEA 416. At step 464, H-DEA 416 recovers the diameter request from JSON and sends the diameter authentication information request to DRA 418, which then forwards the same to AAA server 420. Upon receipt of the request, AAA server 420 sends a diameter authentication information answer to DRA 418, which then forwards the same to H-DEA 416. H-DEA 416 then encodes the diameter authentication information answer in JSON. At step 466, H-DEA 416 sends an S6a message response to V-DEA 412. At step 468, V-DEA 412 recovers the diameter authentication information answer from JSON and sends the diameter authentication information answer to DRA 410, which then forwards the same to NAS 408. As follows, UE is authenticated at step 470.

Further, at step 472, NAS 408 can send a diameter update location request to DRA 410, which then forwards the same to V-DEA 412. V-DEA 412 sends an N32f message request to H-DEA 416. The diameter location request is delivered to AAA server 420, from H-DEA 416 to DRA 418 and to AAA server 420. Upon receipt of the request, AAA server 420 sends a diameter update location answer to DRA 418, which then forwards the same to H-DEA 416. H-DEA 416 sends an S6a message response to V-DEA 412. At step 474, V-DEA 412 can track update location procedures on a "per-UE" basis. At step 476, V-DEA 412 can send the diameter update location answer to DRA 410, which then forwards the same to NAS 408.

According to some implementations, AAA server 420 of 5G IDP 404 can send a diameter cancel location request to DRA 418 at step 478. 5G IDP 404 uses a routing policy to select a DEA instance at step 480. DRA 418 sends the diameter cancel location request to H-DEA 416 at step 482. H-DEA 416 sends an S6a message request to V-DEA 412. As follows, V-DEA 412 sends the diameter cancel location request to DRA 410, which then forwards the same to NAS 408. NAS 408 sends a diameter cancel location answer to DRA 410, which then forwards the same to V-DEA 412. At step 484, V-DEA 412 removes the UE from tracking. At step 486, V-DEA 412 sends an S6a message response to H-DEA 416. H-DEA 416 sends the diameter cancel location answer to DRA 418, which then forwards the same to AAA server 420.

Figure 4D:
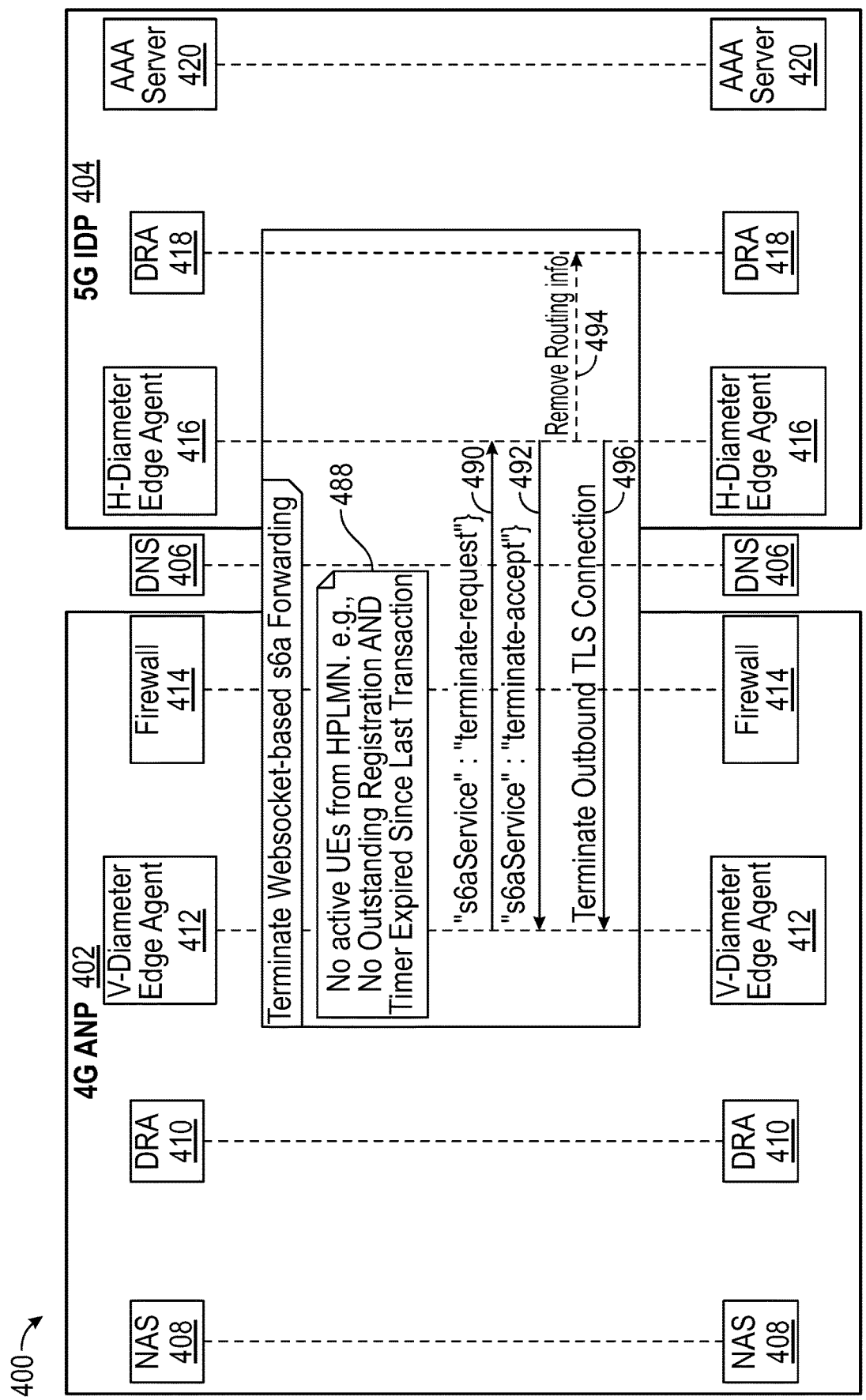

FIG. 4D is a continuous diagram of FIG. 4C. In particular, FIG. 4D illustrates the termination process of WebSocket-based S6a-f. At step 488, V-DEA 412 can check two conditions to determine if the WebSocket-based S6a-f can be terminated. First, V-DEA 412 determines that there is no active UE from HPLMN (e.g., PLMN of 5G IDP 404) (e.g., no outstanding registration). Also, V-DEA 412 determines that a timer has expired since the last transaction. If both conditions are met, V-DEA 412 can, at step 490, send a termination request to H-DEA 416 via S6a service. Upon receipt of the termination request, at step 492, H-DEA 416 sends a termination acceptance message to V-DEA 412 via S6a service. At step 494, H-DEA 416 removes routing information for 4G ANP 402. As follows, the outbound TLS connection between V-DEA 412 and H-DEA 416 can be terminated at step 496.

Figure 5:
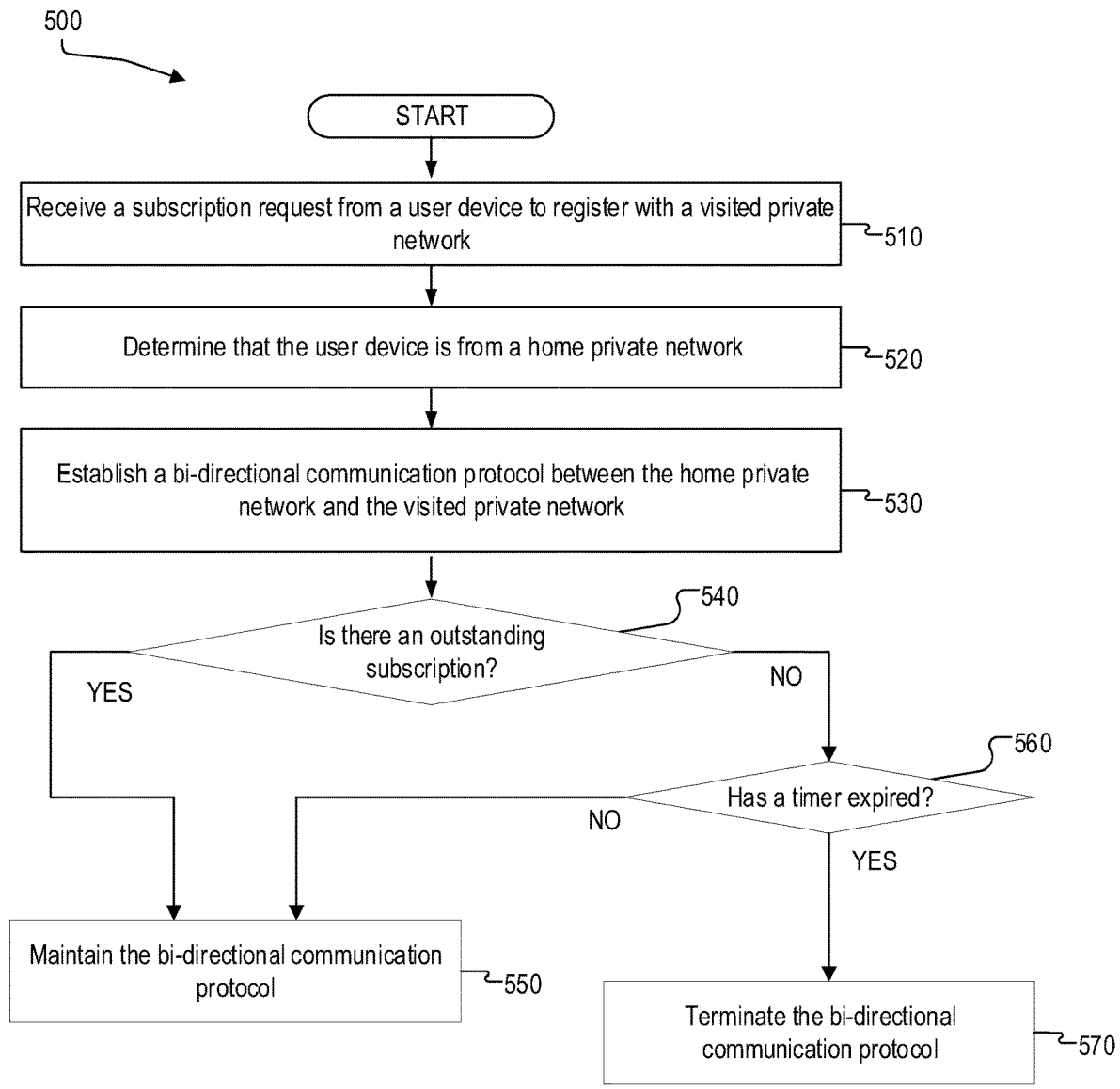
FIG. 5 shows a flowchart of a method of enabling bi-directional communication between networks according to some examples of the present disclosure.

FIG. 5 shows a flowchart of a method 500 of supporting bi-directional SEPP-to-SEPP communications according to some examples of the present disclosure. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements method 500 may perform functions at substantially the same time or in a specific sequence.

At step 510, method 500 includes receiving a subscription request from a user device to operate on (register with) a visited private network. For example, enhanced roaming system 300 and 400 as illustrated in FIGS. 3-4, respectively, can receive a subscription request from a user device to register with and operate on a visited private network (e.g., 5G ANP 302 as illustrated in FIG. 3 or 4G ANP 402 as illustrated in FIG. 4).

In some instances, the visited private network can comprise an edge protection provider such as SEPP or DEA (e.g., V-SEPP 312 as illustrated in FIG. 3 or V-DEA 412 as illustrated in FIG. 4).

At step 520, method 500 includes determining that the user device is from a home network (e.g., a home private network). For example, enhanced roaming system 300 and 400 as illustrated in FIGS. 3-4, respectively, can determine that the user device is from a home network (e.g., 5G IDP 304 as illustrated in FIG. 3 or 5G IDP 404 as illustrated in FIG. 4).

At step 530, method 500 includes establishing a communication protocol between the home network and the visited network (e.g., a visited private network). The communication protocol can enable a bi-directional exchange of roaming signals between the visited private network and the home network during a subscription of the user device to the visited private network across a firewall such as firewall 314 and/or firewall 414. In some instances, the term "WebSocket" is used to describe the communication protocol that enables the bi-directional exchange of roaming signals.

For example, enhanced roaming system 300 and 400 as illustrated in FIGS. 3-4, respectively, can establish a communication protocol between 5G ANP 302 and 5G IDP 304 as illustrated in FIG. 3 or between 4G ANP 402 and 5G IDP 404 as illustrated in FIG. 4.

In some examples, when a bi-directional forwarding service with a visited private network is established, an enhanced roaming system can signal a network function of the visited private network to ensure PLMN-based routing decisions for the home network originated requests towards the visited private network are routed via SEPP or DEA. For example, the enhanced roaming system can re-write a call-back Uniform Resource Identifier (URI) that is signaled by a network function in the visited private network and received in a signaling message by the security edge protection proxy of the home network to a URI that will resolve to the security edge protection proxy of the home network. Moreover, the enhanced roaming system can recover Diameter origin host and origin realm information from the subscription request and update the routing information in the home network to enable routing of server-initiated messages originated in the home network towards the visited private network In some instances, when a bi-directional forwarding service with a home network is established, an enhanced roaming system can operate, via the home network, to intercept Response OK messages to subscribe and unsubscribe request messages.

At step 540, method 500 includes determining if there is an outstanding subscription. For example, enhanced roaming system 300 and 400 as illustrated in FIGS. 3-4, respectively, can determine if there is an outstanding subscription to the visited private network (e.g., 5G ANP 302 as illustrated in FIG. 3 or 4G ANP 402 as illustrated in FIG. 4).

In some examples, an enhanced roaming system can have a counter of outstanding subscriptions between VPLMN and HPLMN (e.g., 5G ANP 302 and 5G IDP 304 as illustrated in FIGS. 3A-3D or 4G ANP 402 and 5G IDP 404 as illustrated in FIGS. 4A-4D). For example, enhanced roaming system 300 and 400 as illustrated in FIGS. 3-4, respectively, can refer to a counter to determine if there is any outstanding subscription between networks before it terminates a bi-directional communication protocol between the networks. More specifically, V-SEPP 312 as illustrated in FIGS. 3A-3D or V-DEA 412 as illustrated in FIGS. 4A-4D can be enhanced with functionality to record the number of outstanding subscriptions to the service of 5G ANP 302 or 4G ANP 402, respectively, and to trigger the deactivation/termination of the connection when there is no outstanding subscription.

If there is any outstanding subscription, method 500 includes maintaining the bi-directional communication protocol at step 550. For example, enhanced roaming system 300 and 400 as illustrated in FIGS. 3-4, respectively, can maintain the bi-direction communication protocol between 5G ANP 302 and 5G IDP 304 as illustrated in FIG. 3 or between 4G ANP 402 and 5G IDP 404 as illustrated in FIG. 4.

If there is no outstanding subscription, method 500 includes determining if a timer has expired at step 560. For example, enhanced roaming system 300 and 400 as illustrated in FIGS. 3-4, respectively, can determine if a timer has expired since the last transaction with 5G ANP 302 as illustrated in FIG. 3 or 4G ANP 402 as illustrated in FIG. 4.

If the timer has not expired, method 500 includes maintaining the bi-directional communication protocol at step 550. For example, enhanced roaming system 300 and 400 as illustrated in FIGS. 3-4, respectively, can maintain the bi-directional communication protocol between 5G ANP 302 and 5G IDP 304 as illustrated in FIG. 3 or between 4G ANP 402 and 5G IDP 404 as illustrated in FIG. 4.

If the timer has expired, method 500 includes terminating the bi-directional communication protocol at step 570. For example, enhanced roaming system 300 and 400 as illustrated in FIGS. 3-4, respectively, terminate the bi-directional communication protocol between 5G ANP 302 and 5G IDP 304 as illustrated in FIG. 3 or between 4G ANP 402 and 5G IDP 404 as illustrated in FIG. 4.

More specifically, if there is no outstanding subscription and a timer has expired since the last transaction (e.g., the last response received by the visited private network or the home network), the enhanced roaming system can terminate the bi-directional communication protocol. For example, enhanced roaming system 300 and 400 as illustrated in FIGS. 3-4, respectively, can terminate, if there is no outstanding subscription and a timer has expired, the bi-directional communication protocol between 5G ANP 302 and 5G IDP 304 as illustrated in FIG. 3 or between 4G ANP 402 and 5G IDP 404 as illustrated in FIG. 4.

Furthermore, method 500 includes signaling an SCP of the home network to update routing information when a bi-directional communication protocol is terminated. For example, enhanced roaming system 300 and 400 as illustrated in FIGS. 3-4, respectively, can signal SCP 310 of 5G ANP 302 as illustrated in FIGS. 3A-3D to update any routing information when the bi-directional forwarding instance with 5G IDP 304 is terminated.

According to some implementations, the information exchanged over the WebSocket can mimic the information exchanged using established N32-c signaling as defined in 3GPP 29.573. However, instead of establishing a uni-directional N32-f instance, an enhanced roaming system of the present disclosure establishes a bi-directional N32-f forwarding instance.

Figure 6:
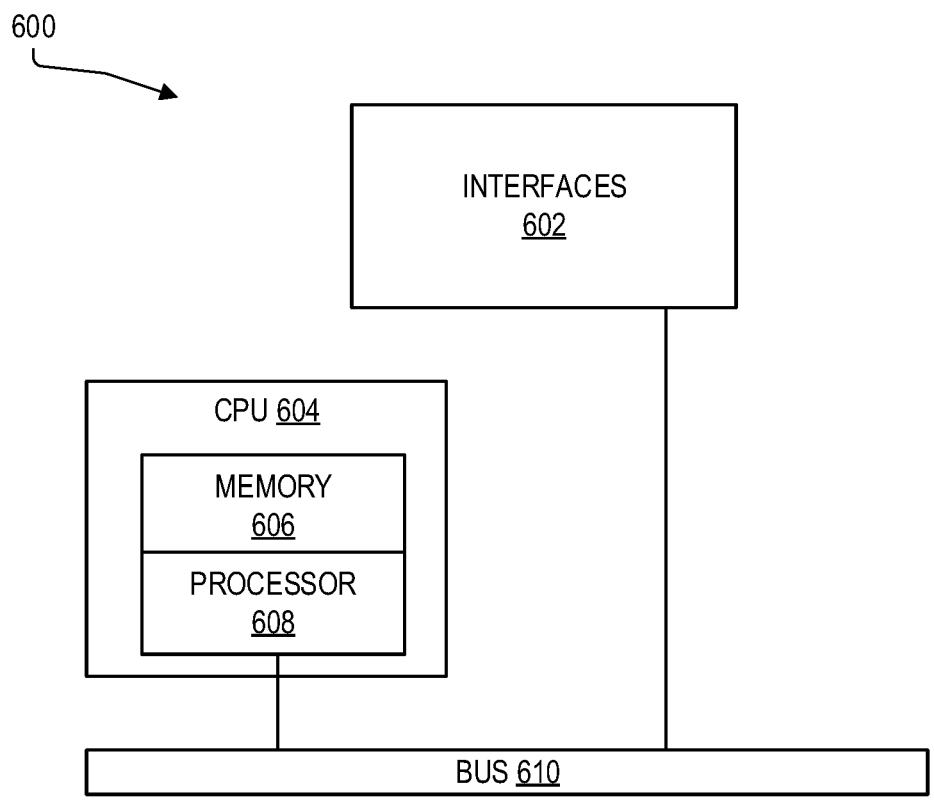
FIG. 6 illustrates an example network device, according to some aspects of the present disclosure.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 604 to efficiently perform routing computations, network diagnostics, security functions, etc.

Although the system shown in FIG. 6 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

Figure 7:
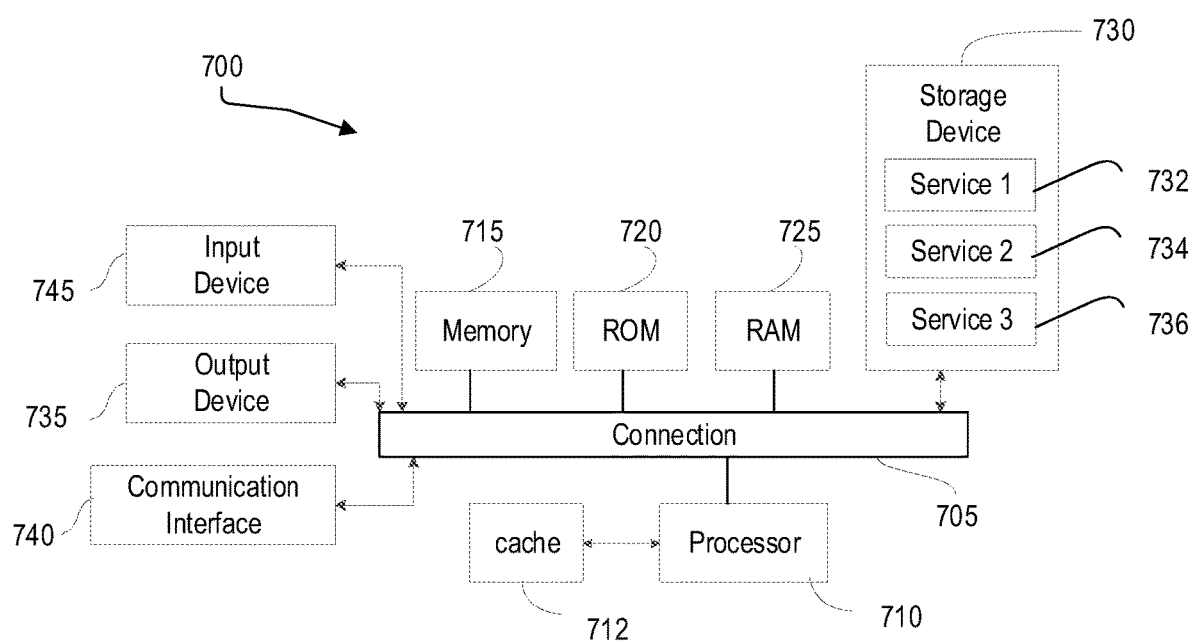
FIG. 7 shows an example computing system, which can be for example any computing device that can implement components of the system.

FIG. 7 illustrates an example computing system 700 including components in electrical communication with each other using a connection 705 upon which one or more aspects of the present disclosure can be implemented. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
receiving a subscription request from a user device to operate on a visited private network;
determining that the user device is associated with a home network;
establishing a communication protocol between a security edge protection proxy of the visited private network and a security edge protection proxy of the home network, wherein the communication protocol enables bi-directional exchange of roaming signals between the visited private network and the home network while user device is operating on the visited private network; and
maintaining the communication protocol between the security edge protection proxy of the home network and the security edge protection proxy of the visited private network while at least one outstanding subscription with the visited network, for a device associated with the home network, remains valid.

2. The method of claim 1, further comprising:
re-writing a callback Uniform Resource Identifier (URI) signaled by a network function in the visited private network and received by the security edge protection proxy of the home network to a URI that will resolve to the security edge protection proxy of the home network.

3. The method of claim 1, further comprising:
recovering Diameter origin host and origin information from the subscription request and updating routing information in the home network to enable routing of server-initiated messages originated in the home network towards the visited private network.

4. The method of claim 1, further comprising:
determining that subscription of the user device to the visited private network has ended;
and terminating the communication protocol between the security edge protection proxy of the home network and the security edge protection proxy of the visited private network.

5. The method of claim 1, further comprising:
determining that a timer has been expired, the timer defining a time period for the communication protocol; and
terminating the communication protocol between the home network and the visited private network upon determining that the timer has expired.

6. The method of claim 1, wherein when the visited private network is a private 5G network, a bi-directional N32 interface is used to forward signals between the visited private network and the home network via the communication protocol.

7. The method of claim 1, wherein when the visited private network is a private LTE network, a S6a interface is used to forward signals between the visited private network and the home network via the communication protocol.

8. A network component comprising:
one or more memories having computer-readable instructions stored therein; and
one or more processors configured to execute the computer-readable instructions to:
receive a subscription request from a user device to operate on a visited private network;
determine that the user device is associated with a home network;
establish a communication protocol between a security edge protection proxy of the visited private network and a security edge protection proxy of the home network, wherein the communication protocol enables bi-directional exchange of roaming signals between the visited private network and the home network while user device is operating on the visited private network; and
maintain the communication protocol between the security edge protection proxy of the home network and the security edge protection proxy of the visited private network while at least one outstanding subscription with the visited network, for a device associated with the home network, remains valid.

9. The network component of claim 8, wherein the one or more processors are further configured to execute the computer-readable instructions to re-write a callback Uniform Resource Identifier (URI) signaled by a network function in the visited private network and received by the security edge protection proxy of the home network to a URI that will resolve to the security edge protection proxy of the home network.

10. The network component of claim 8, wherein the one or more processors are further configured to execute the computer-readable instructions to recover Diameter origin host and origin information from the subscription request and updating routing information in the home network to enable routing of server-initiated messages originated in the home network towards the visited private network.

11. The network component of claim 8, wherein the one or more processor are further configured to execute the computer-readable instructions to:
determine that subscription of the user device to the visited private network has ended; and
terminate the communication protocol between the security edge protection proxy of the home network and the security edge protection proxy of the visited private network.

12. The network component of claim 8, wherein the one or more processor are further configured to execute the computer-readable instructions to:
determine that a timer has been expired, the timer defining a time period for the communication protocol; and
terminate the communication protocol between the home network and the visited private network upon determining that the timer has expired.

13. The network component of claim 8, wherein when the visited private network is a private 5G network, a bi-directional N32 interface is used to forward signals between the visited private network and the home network via the communication protocol, and
when the visited private network is a private LTE network, a S6a interface is used to forward signals between the visited private network and the home network via the communication protocol.

14. One or more non-transitory computer-readable media comprising computer-readable instructions, which when executed by one or more processors of a network component, cause the network component to:
receive a subscription request from a user device to operate on a visited private network;
determine that the user device is associated with a home network;
establish a communication protocol between a security edge protection proxy of the visited private network and a security edge protection proxy of the home network, wherein the communication protocol enables bi-directional exchange of roaming signals between the visited private network and the home network while user device is operating on the visited private network; and
maintain the communication protocol between the security edge protection proxy of the home network and the security edge protection proxy of the visited private network while at least one outstanding subscription with the visited network, for a device associated with the home network, remains valid.

15. The one or more non-transitory computer-readable media of claim 14, wherein the execution of the computer-readable instructions by the one or more processors, further cause the one or more processors to re-write a callback Uniform Resource Identifier (URI) signaled by a network function in the visited private network and received by the security edge protection proxy of the home network to a URI that will resolve to the security edge protection proxy of the home network.

16. The one or more non-transitory computer-readable media of claim 14, wherein the execution of the computer-readable instructions by the one or more processors, further cause the one or more processors to recover Diameter origin host and origin information from the subscription request and updating routing information in the home network to enable routing of server-initiated messages originated in the home network towards the visited private network.

17. The one or more non-transitory computer-readable media of claim 14, wherein the execution of the computer-readable instructions by the one or more processors, further cause the one or more processors to:
determine that subscription of the user device to the visited private network has ended; and
terminate the communication protocol between the security edge protection proxy of the home network and the security edge protection proxy of the visited private network.

18. The one or more non-transitory computer-readable media of claim 14, wherein the execution of the computer-readable instructions by the one or more processors, further cause the one or more processors to:
determine that a timer has been expired, the timer defining a time period for the communication protocol; and
terminate the communication protocol between the home network and the visited private network upon determining that the timer has expired.

19. The one or more non-transitory computer-readable media of claim 14, wherein when the visited private network is a private 5G network, a bi-directional N32 interface is used to forward signals between the visited private network and the home network via the communication protocol; and
when the visited private network is a private LTE network, a S6a interface is used to forward signals between the visited private network and the home network via the communication protocol.

* * * * *